United States Patent
Matsushita et al.

(10) Patent No.: US 7,412,829 B2
(45) Date of Patent: Aug. 19, 2008

(54) HYDRAULIC APPARATUS FOR A BICYCLE BRAKE LEVER DEVICE

(75) Inventors: Tatsuya Matsushita, Sakai (JP); Osamu Kariyama, Sakai (JP); Shinichi Takizawa, Izumisano (JP); Toshiyuki Ueda, Izumi (JP); Kenichi Kikuno, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 126 days.

(21) Appl. No.: 11/164,995

(22) Filed: Dec. 13, 2005

(65) Prior Publication Data

US 2007/0131503 A1 Jun. 14, 2007

(51) Int. Cl.
*B60T 11/26* (2006.01)
*B60T 17/22* (2006.01)

(52) U.S. Cl. .............................. 60/584; 60/585; 60/592; 60/453

(58) Field of Classification Search .................... 60/453, 60/584, 585, 592; 188/344, 352
See application file for complete search history.

(56) References Cited

U.S. PATENT DOCUMENTS

| | | | | | |
|---|---|---|---|---|---|
| 3,050,080 | A | * | 8/1962 | Pagano | 188/352 |
| 3,554,334 | A | * | 1/1971 | Shimano et al. | 188/344 |
| 4,164,241 | A | * | 8/1979 | Kubo | 188/352 |
| 4,307,748 | A | * | 12/1981 | Mathias | 137/381 |
| 4,470,577 | A | * | 9/1984 | Warwick | 188/352 |
| 4,635,442 | A | * | 1/1987 | Bass | 60/584 |
| 4,834,140 | A | * | 5/1989 | Schmidt | 188/352 |
| 4,979,541 | A | * | 12/1990 | Holland | 188/352 |

(Continued)

FOREIGN PATENT DOCUMENTS

EP 94459 A1 * 11/1983

(Continued)

OTHER PUBLICATIONS

Unpublished U.S. Appl. No. 11/061,358 "Hydraulic Disc Brake Lever Assembly," Shinichi Takizawa et al., filed Feb. 18, 2005.

(Continued)

*Primary Examiner*—Thomas E Lazo
(74) *Attorney, Agent, or Firm*—James A. Deland

(57) ABSTRACT

A hydraulic apparatus such as a bleeder screw comprises an inner end, an outer end, and a main body extending between the inner end and the outer end. The main body includes a first section having a threaded outer peripheral surface a second section disposed between the first section and the inner end. The second section has a smaller diameter than the threaded outer peripheral surface of the first section, and an axial length of the threaded outer peripheral surface is less than an axial length of the second section. An internal fluid passage opens through an outer peripheral surface of the second section at a location between the inner end and the threaded outer peripheral surface, and the internal fluid passage opens through the main body at a location between the threaded outer peripheral surface and the outer end. Another hydraulic apparatus comprises a first fluid reservoir having a first reservoir chamber and a first reservoir outlet; a second reservoir having a second reservoir chamber and a second reservoir outlet; and a common fluid passage in fluid communication with the first reservoir outlet and the second reservoir outlet to flow fluid from both the first reservoir chamber and the second reservoir chamber to the atmosphere.

21 Claims, 4 Drawing Sheets

U.S. PATENT DOCUMENTS

| | | | |
|---|---|---|---|
| 5,447,214 A * | 9/1995 | Appelgren | 188/352 |
| 5,524,736 A | 6/1996 | Korshak | |
| 5,560,457 A * | 10/1996 | Rike | 188/352 |
| 5,562,188 A * | 10/1996 | Appelgren | 188/352 |
| 2003/0121262 A1 | 7/2003 | Lumpkin | |
| 2005/0061590 A1 | 3/2005 | Lumpkin | 188/151 R |

FOREIGN PATENT DOCUMENTS

| | | | |
|---|---|---|---|
| EP | 252701 A2 | | 1/1988 |
| GB | 977809 | | 12/1964 |
| GB | 2006903 A | * | 5/1979 |

OTHER PUBLICATIONS

Unpublished U.S. Appl. No. 11/156,501, "Hydraulic Disc Brake Lever Assembly," filed Jun. 17, 2005; continuation-in-part of U.S. Appl. No. 11/061,358.

European Search Report for EP 06023695.7, the European application that corresponds to this application, dated Oct. 15, 2007.

* cited by examiner

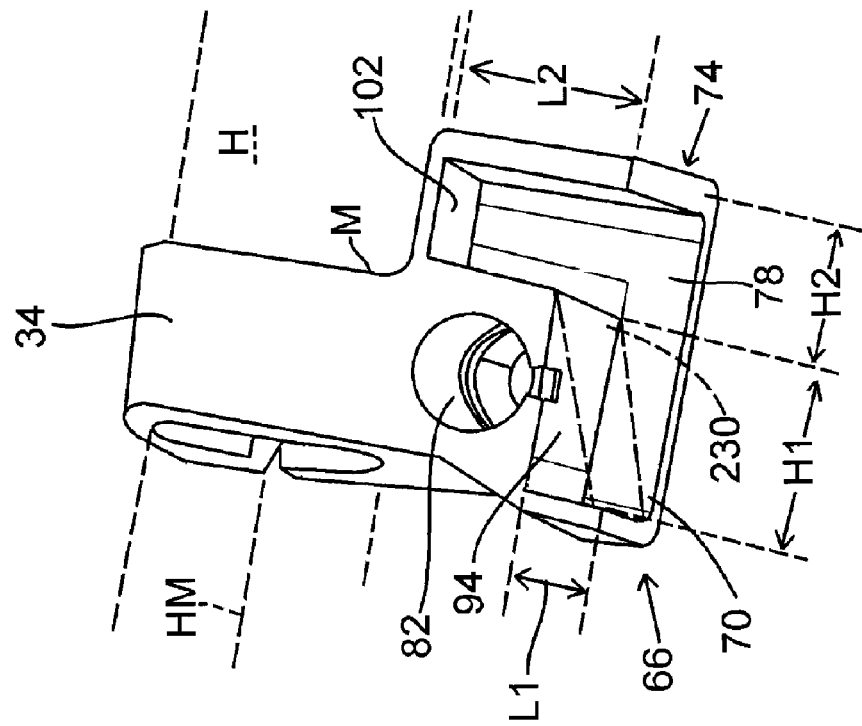
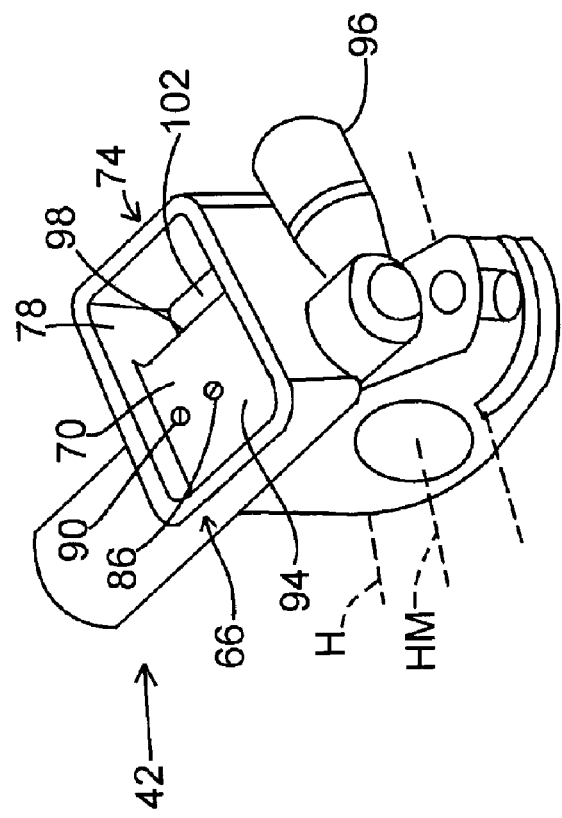
Fig. 3
Fig. 2

HYDRAULIC APPARATUS FOR A BICYCLE BRAKE LEVER DEVICE

BACKGROUND OF THE INVENTION

The present invention is directed to bicycles and, more particularly, to a bleeder screw for a bicycle hydraulic brake device.

In recent years, some high performance bicycles have been equipped with hydraulic disk brake systems. Hydraulic disk brake systems typically include a caliper housing, first and second brake pads mounted on opposite inner sides of the caliper housing so as to face each other, and one or more pistons that move the first and/or second brake pads towards each other in response to hydraulic pressure created by the actuation of a brake lever assembly mounted to the bicycle handlebar. A rotor that rotates with the bicycle wheel is disposed between the first and second brake pads. The first and second brake pads apply a frictional force to the rotor when they move towards each other in response to the hydraulic pressure created by the actuation of the brake lever assembly, thereby stopping rotation of the rotor and the bicycle wheel.

The brake lever assembly typically comprises a base member structured to attach to the bicycle handlebar and a brake lever pivotably coupled to the base member. The base member includes or is attached to a master cylinder and a fluid reservoir that supplies brake fluid to the master cylinder through appropriate orifices. The fluid reservoir has a removable cap so that brake fluid may be added as necessary. The master cylinder includes a brake fluid outlet and a piston that reciprocates in response to pivoting of the brake lever. A tube is connected between the brake fluid outlet and the caliper housing to communicate brake fluid between the master cylinder and the caliper housing. Pivoting the brake lever toward the handlebar causes the brake lever to press against the piston so that the piston forces brake fluid through the brake fluid outlet to the caliper housing, thereby causing the first and second brake pads to contact the rotor.

Brake fluid is a substantially compressionless fluid that allows the brake fluid to properly communicate the force from the piston in the brake lever assembly to the piston(s) in the caliper housing. Accordingly, it is necessary to ensure that there is no air, which is highly compressible, in the path from the piston in the brake lever assembly to the piston(s) in the caliper. Conventionally, this is accomplished by installing a bleeder screw at the fluid reservoir in the caliper housing. The bleeder screw typically has a solid inner end and an internal fluid passage that extends from a side of the screw near the inner end to the outer end of the screw. When the bleeder screw is screwed into the caliper housing, the solid inner end closes an orifice at the fluid reservoir. Loosening the bleeder screw allows brake fluid to move past the solid inner end, through the internal fluid passage and out of the outer end of the screw. Thus, by loosening the bleeder screw and operating the brake lever, fluid is forced from the reservoir in the brake lever assembly, through the tubing connecting the master cylinder to the caliper housing, and through the bleeder screw. Any air in the path from the master cylinder to the caliper housing exits through the bleeder screw together with any air entrained in the brake fluid. The bleeder screw then is tightened to seal the system.

Because brake fluid usually exits the bleeder screw during the bleeding operation, it is necessary to collect and dispose of the removed brake fluid. Conventionally, one end of a tube is placed over the outer end of the bleeder screw, and the other end of the tube is placed in a container. The exiting brake fluid passes from the outer end of the bleeder screw, through the tube and into the container. The removed brake fluid then may be disposed in a suitable manner. However, as a practical matter, the brake fluid sometimes leaks from between the bleeder screw and the tubing, the tubing is very difficult to clean so that brake fluid continues to drip from the tube when the tube is later stored, and the bleeding operation itself wastes a substantial amount of brake fluid.

SUMMARY OF THE INVENTION

The present invention is directed to various features of a bicycle brake device. In one feature, a hydraulic apparatus for a bicycle brake lever device has the form of a bleeder screw comprising an inner end, an outer end, and a main body extending between the inner end and the outer end. The main body includes a first section having a threaded outer peripheral surface a second section disposed between the first section and the inner end. The second section has a smaller diameter than the threaded outer peripheral surface of the first section, and an axial length of the threaded outer peripheral surface is less than an axial length of the second section. An internal fluid passage opens through an outer peripheral surface of the second section at a location between the inner end and the threaded outer peripheral surface, and the internal fluid passage opens through the main body at a location between the threaded outer peripheral surface and the outer end.

In another feature, a hydraulic apparatus for a bicycle brake lever device comprises a first fluid reservoir having a first reservoir chamber and a first reservoir outlet; a second reservoir having a second reservoir chamber and a second reservoir outlet; and a common fluid passage in fluid communication with the first reservoir outlet and the second reservoir outlet to flow fluid from both the first reservoir chamber and the second reservoir chamber to the atmosphere.

Additional inventive features will become apparent from the description below, and such features alone or in combination with the above features may form the basis of further inventions as recited in the claims and their equivalents.

BRIEF DESCRIPTION OF THE DRAWINGS

FIG. 2 is a bottom view of a reservoir assembly with the bottom cover removed;

FIG. 3 is a front cutaway view of the reservoir assembly;

DETAILED DESCRIPTION OF THE EMBODIMENTS

Figure 1:
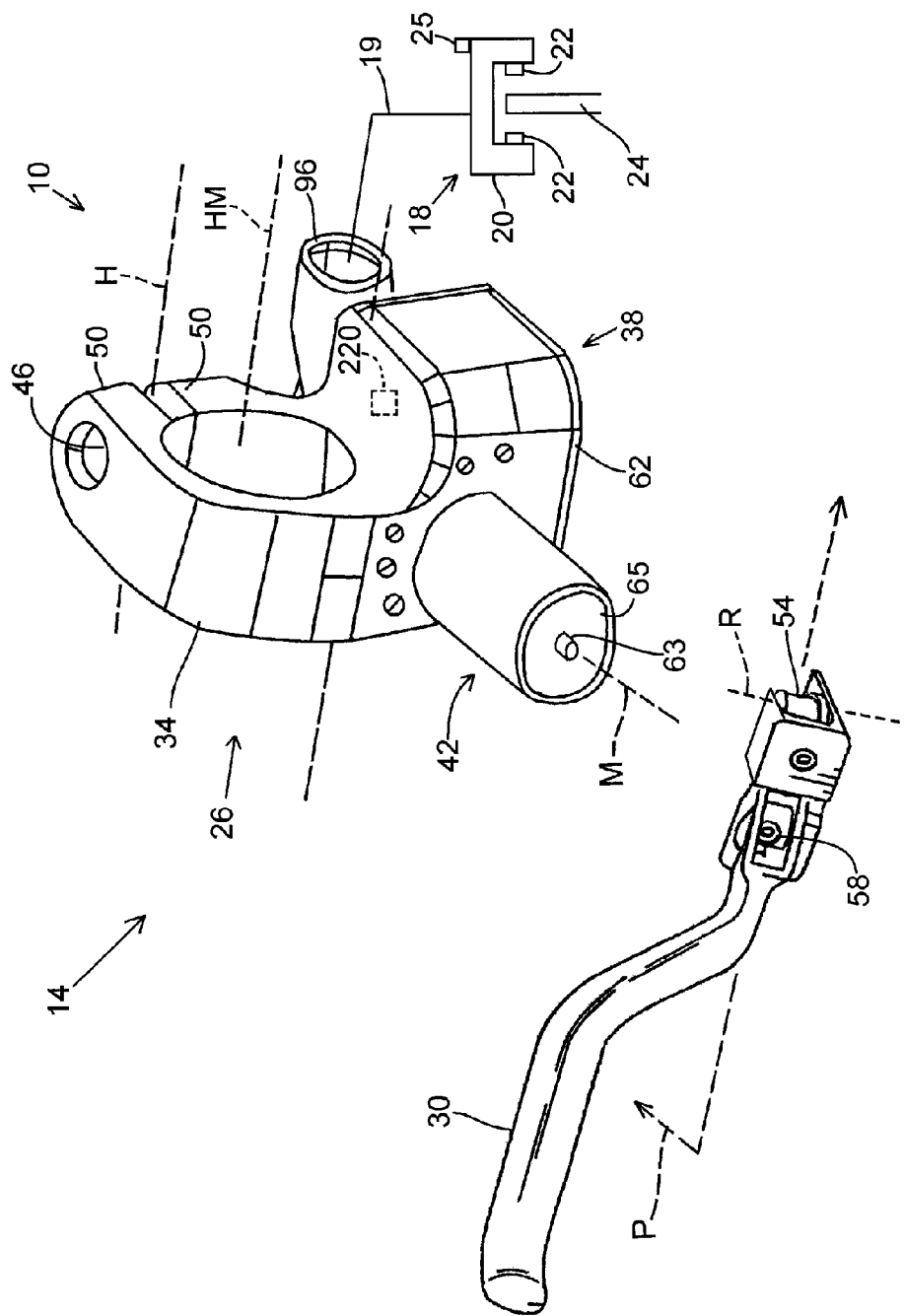
FIG. 1 is a schematic view of a bicycle brake system.

FIG. 1 is a schematic view of a bicycle brake system 10. Bicycle brake system 10 includes a brake lever assembly 14, a caliper assembly 18, and a brake fluid tube 19 connected between brake lever assembly 14 and caliper assembly 18. Caliper assembly 18 may be a conventional caliper assembly comprising a caliper housing 20 that supports a pair of oppositely facing brake pads 22 that frictionally contact a rotor 24 in response to hydraulic pressure applied to one or more pistons (not shown). A fluid reservoir (not shown) is disposed within caliper housing 20, and a bleeding screw 25 is screwed into caliper housing 20 for bleeding a fluid such as air and/or brake fluid from the fluid reservoir.

Brake lever assembly 14 includes a brake lever mounting assembly 26 and a brake lever 30. Brake lever mounting assembly 26 includes a handlebar mount 34 defining a handlebar mounting axis HM, a fluid reservoir 38, and a master cylinder 42. In this embodiment, both reservoir assembly 38 and master cylinder 42 are disposed entirely below handlebar mounting axis HM to provide a compact structure. As used herein, terms such as "upper," "below," etc. are determined from the orientation shown in FIG. 1, which also corresponds to a configuration wherein brake lever assembly 14 is mounted to handlebar H with brake lever 30 located in front of handlebar H. Handlebar mount 34 has a conventional structure that wraps around a handlebar H and is tightened in a conventional manner by a screw (not shown) that is screwed into aligned openings 46 in mounting ears 50.

Portions of brake lever mounting assembly 26, particularly the portions that connect brake lever 30 to reservoir assembly 38 and master cylinder 42, have been omitted to facilitate viewing. It should be sufficient to say that brake lever 30 is pivotably mounted relative to master cylinder 42 through a pivot shaft 54 defining a rotational axis R so that brake lever 30 rotates around axis R within a plane P toward and away from handlebar H. Brake lever 30 includes a conventional piston interface structure 58 that interfaces with a shaft 63 of a master cylinder piston 65 for reciprocally moving master cylinder piston 65 along a movement axis M. Master cylinder piston 65 includes a conventional return spring (not shown) that biases master cylinder piston 65 outwardly (toward the left in FIG. 1).

Reservoir assembly 38 includes a cover 62, a first reservoir 66 (FIG. 2) having a first reservoir chamber 70, and a second reservoir 74 having a second reservoir chamber 78. First reservoir chamber 70 is in fluid communication with a master cylinder chamber 82 (FIG. 3) through a timing port 86 and a compensation port 90, both of which are formed in an upper surface 94 of first reservoir chamber 70. The functions of timing port 86 and compensation port 90 are well known and will not be described further. Fluid entering master cylinder chamber 82 is communicated to a fluid outlet 96 connected to brake fluid tube 19. As shown in FIG. 3, a vertical length L1 of first reservoir chamber 70 is less than a horizontal length H1 of first reservoir chamber 70; a vertical length L2 of second reservoir chamber 78 is less than a horizontal length H2 of second reservoir chamber 78; vertical length L1 of first reservoir chamber 70 is less than vertical length L2 of second reservoir chamber 78; and horizontal length H1 of first reservoir chamber 70 is greater than horizontal length H2 of second reservoir chamber 78. As a result, a junction between first reservoir 66 and second reservoir 74 forms a stepped surface 98.

The bottom surfaces of first reservoir chamber 70 and second reservoir chamber 78 are formed by cover 62 and are at the same vertical level. However, an upper surface 102 of second reservoir chamber 68 is positioned vertically higher than upper surface 94 of first reservoir chamber 70. As a result of the foregoing structure, first reservoir chamber 70 and ports 86 and 90 are disposed below master cylinder chamber 82 and movement axis M, master cylinder chamber 82 and movement axis M are disposed laterally adjacent to second reservoir chamber 78, and upper surface 102 is disposed above movement axis M and ports 86 and 90. Upper surface 102 functions as an air entrainment surface such that any air that enters reservoir assembly 38 will be urged towards second reservoir chamber 78 and upper surface 102. The entrained air will be trapped in second reservoir chamber 78 even during rough operation of the bicycle. As a result, timing port 86 and compensation port 90 will be continually immersed in brake fluid, no air will enter the path between master cylinder 42 and caliper housing 18, and firm and reliable brake operation will be maintained.

To install brake fluid into the above-described system, brake lever mounting assembly 26 is rotated around handlebar mounting axis HM until cover 62 is facing upwardly. Cover 62 is be removed, brake fluid is installed into first reservoir chamber 70 and second reservoir chamber 78, bleeder screw 25 at caliper housing 20 is loosened, and brake lever 30 is operated to force brake fluid through master cylinder chamber 82, brake fluid tube 19 and the fluid reservoir in caliper housing 20 until brake fluid flows through bleeder screw 25 without air bubbles. Bleeder screw 25 then is tightened, cover 62 is reinstalled, and brake lever mounting assembly 26 is rotated around handlebar mounting axis HM until reservoir assembly 38 is disposed below handlebar H in the operating position.

Alternatively, once cover 62 is removed, bleeder screw 25 at caliper housing 20 may be loosened and brake fluid pumped through bleeder screw 25 until the brake fluid fills the reservoir chamber in caliper housing 20, flows through brake fluid tube 19 and fills first reservoir chamber 70 and second reservoir chamber 78. Thereafter, cover 62 is reinstalled, and brake lever mounting assembly 26 is rotated around handlebar mounting axis HM until reservoir assembly 38 is disposed below handlebar H in the operating position. In either case, once brake lever mounting assembly 26 is in the proper position, any air remaining in reservoir assembly 38 will migrate toward upper surface 102 in second reservoir chamber 78 and be entrained. As a result, air will not be allowed to enter the path between master cylinder 42 and caliper housing 18 as noted above.

Figure 4:
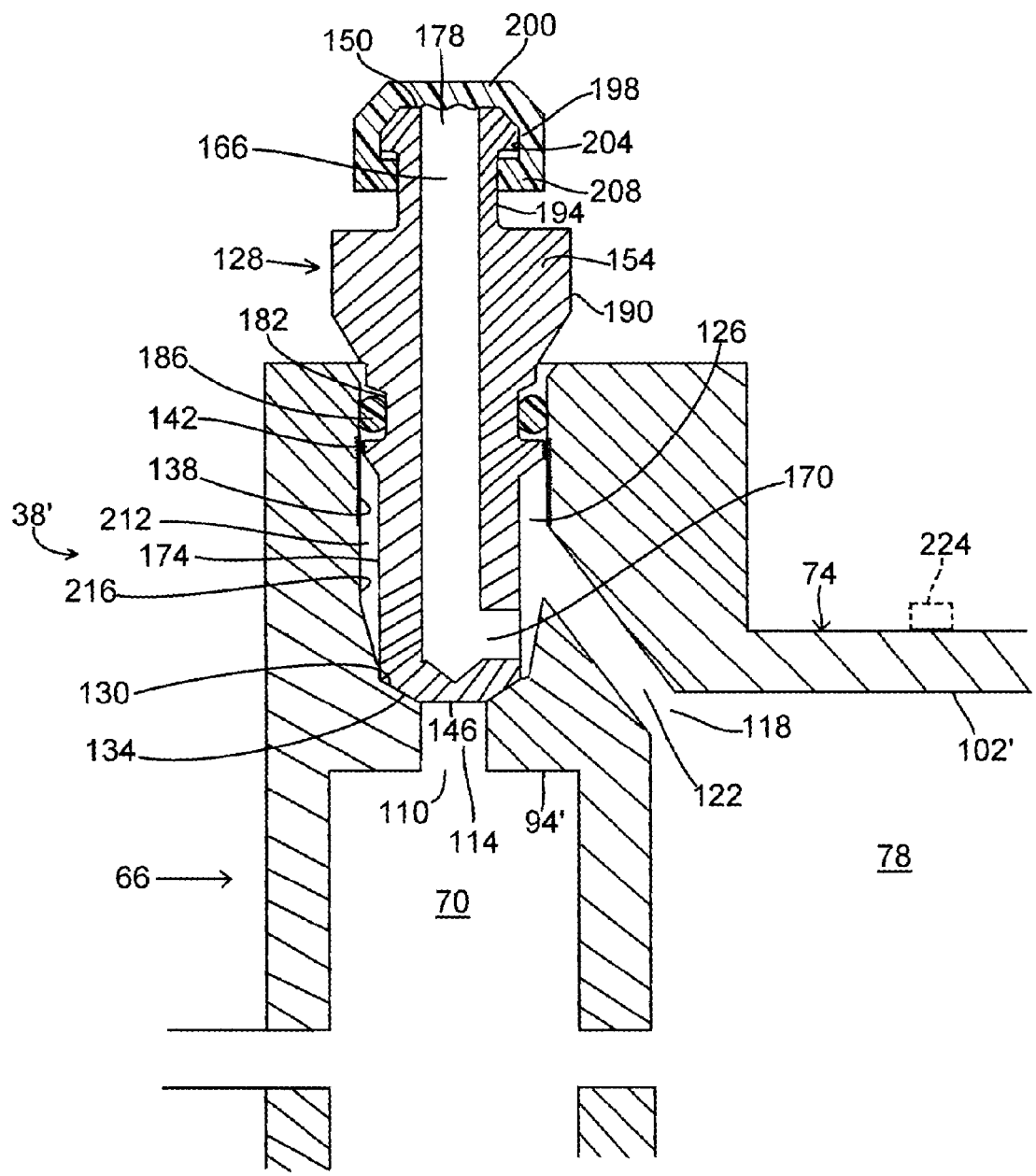
FIG. 4 is a detailed view of an alternative embodiment of a reservoir assembly showing a brake fluid bleeding structure.

FIG. 4 is a detailed view of upper portions of an alternative embodiment of a reservoir assembly 38'. This embodiment enables removal of air trapped in both first reservoir chamber 70 and second reservoir chamber 78. More specifically, reservoir assembly 38' has a first reservoir outlet 110 formed in an upper surface 94' of first reservoir 66 and a first reservoir passage 114 extending upwardly from first reservoir outlet 110. Additionally, reservoir assembly 38' has a second reservoir outlet 118 formed in an upper surface 102' of second reservoir 74 and a second reservoir passage 122 extending upwardly and diagonally from a corner of second reservoir chamber 78 formed by upper surface 102'. First reservoir passage 114 and second reservoir passage 122 communicate fluid from first reservoir chamber 70 and second reservoir chamber 78 to a common fluid passage 126.

Common fluid passage 126 is dimensioned to accommodate a bleeder screw 128 therein. An annular chamfered seat 130 is formed in reservoir assembly 38' at the junction of first reservoir passage 114 and common fluid passage 126 for contacting an annular chamfered surface 134 of bleeder screw 128. A threaded inner peripheral surface 138 is formed at an upper portion of common fluid passage 126 for engaging a threaded outer peripheral surface 142 of bleeder screw 128.

Figure 5:
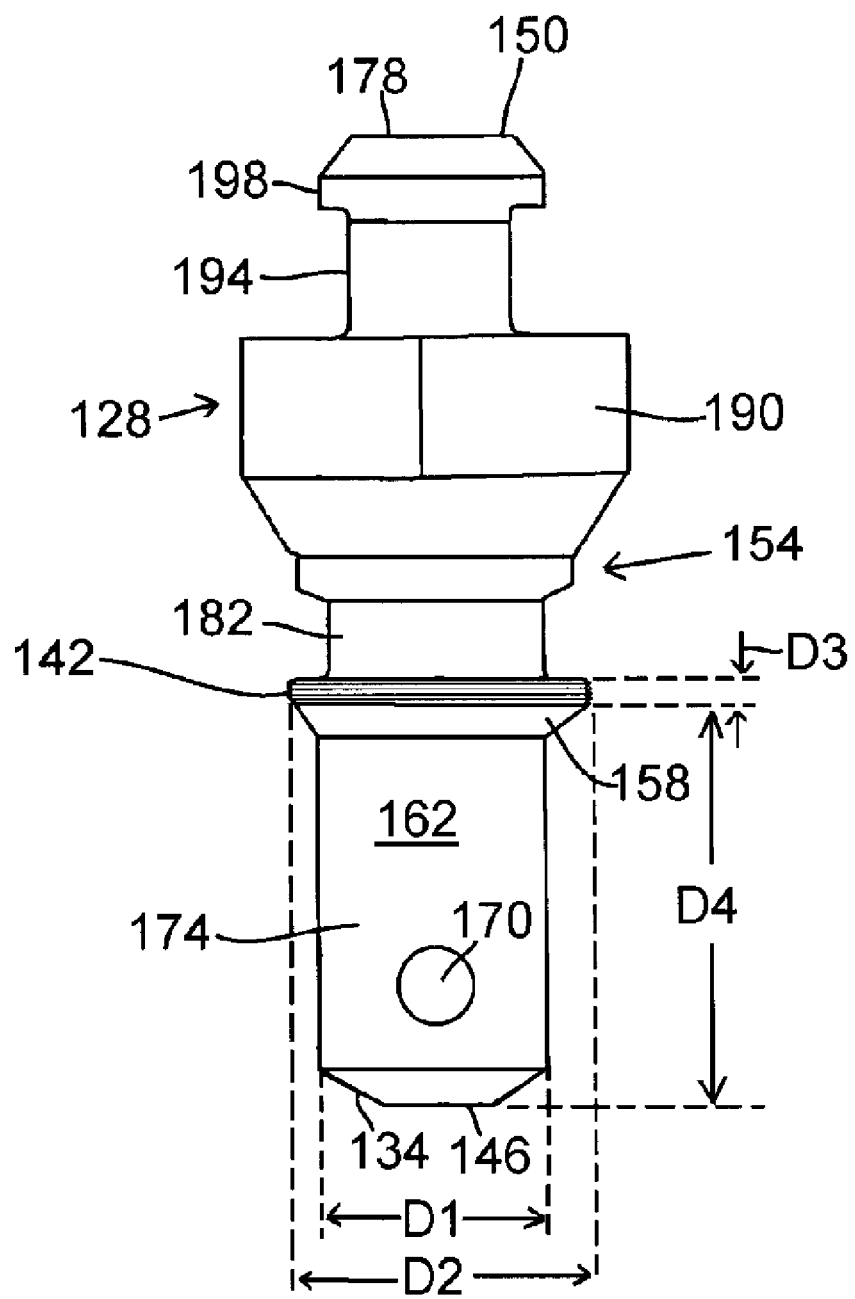
FIG. 5 is a more detailed view of the bleeder screw shown in FIG. 4.

As shown in FIG. 5, bleeder screw 128 comprises an inner end 146, an outer end 150, and a main body 154 extending between inner end 146 and outer end 150. Main body 154 includes a first section 158 and an unthreaded second section 62, wherein first section 158 has a threaded outer peripheral surface 142, and second section 162 is disposed between first section 158 and inner end 146. Second section 162 has a diameter D1 that is less than a diameter D2 of threaded outer peripheral surface 142 of first section 158, and an axial length D3 of threaded outer peripheral surface 142 is less than an axial length D4 of second section 162. More specifically, in this embodiment, axial length D3 of threaded outer peripheral surface 142 is less than approximately 75% of axial length D4 of second section 162, preferably less than approximately 50% of axial length D4 of second section 162, more preferably less than approximately 25% of axial length D4 of second section 162, and in this embodiment less than approximately 10% of axial length D4 of second section 162.

An internal fluid passage 166 (FIG. 4) has an outlet 170 that opens through an outer peripheral surface 174 of second section 162 at a location between inner end 146 and threaded outer peripheral surface 142. Internal fluid passage 166 also has an outlet 178 that opens through main body 154 at a location between threaded outer peripheral surface 142 and outer end 150.

A radially recessed seal supporting outer peripheral surface 182 is disposed on main body 154 between threaded outer peripheral surface 142 and outer end 150 for installing a seal such as an O-ring 186 that surrounds seal supporting outer peripheral surface 182. A tool engagement surface 190 in the form of an angled, hexagonal outer peripheral surface also is formed on main body 154 between threaded outer peripheral surface 142 and outer end 150, and particularly between seal supporting outer peripheral surface 182 and outer end 150. Main body 154 also includes a radially constricted outer peripheral surface 194 and a radially expanded outer peripheral surface 198 disposed between radially constricted outer peripheral surface 194 and outer end 150. A sealing cap 200 formed of an elastomeric material has a radially expanded inner peripheral surface 204 and a radially inwardly extending portion 208, wherein radially expanded inner peripheral surface 204 extends over the radially expanded outer peripheral surface 198 of main body 154, and radially inwardly extending portion 208 engages radially constricted outer peripheral surface 194 of main body 154.

As shown in FIG. 4, inner end 146 of bleeder screw 128 is solid so that, when bleeder screw 128 is screwed into common passage 126, chamfered surface 134 of bleeder screw 128 contacts seat 130, and fluid flow from first reservoir chamber 70 into common passage 126 is blocked. On the other hand, outer peripheral surface 174 of bleeder screw 128 forms a transition passage 212 with an inner peripheral surface 216 of common passage. Second reservoir passage 122 is in fluid communication with transition passage 212 so that air and/or brake fluid may pass from second reservoir chamber 78, through internal fluid passage 166 and through outlet 178 at outer end 150 of bleeder screw 128. Sealing cap 200 seals internal fluid passage 166 from the atmosphere.

To install brake fluid into the above-described alternative embodiment, the bleeder screws 25 and 128 at caliper housing 20 and reservoir assembly 38', respectively, are loosened. Brake fluid then may be pumped through bleeder screw 25 until it fills the reservoir chamber in caliper housing 20 and flows through brake fluid tube 19. The brake fluid then fills first reservoir chamber 70 while air passes through first fluid passage 114, transition passage 212 and internal fluid passage 166 and exits through outlet 178 at outer end 150 of bleeder screw 128. After first reservoir chamber 70 is filled, brake fluid fills second reservoir chamber 78 until all of the air is displaced and brake fluid flows through second fluid passage 122, transition passage 212 and internal fluid passage 166 and exits through outlet 178 at outer end 150 of bleeder screw 128. Then it is only necessary to tighten bleeder screws 25 and 128 to complete the operation.

While the above is a description of various embodiments of inventive features, further modifications may be employed without departing from the spirit and scope of the present invention. For example, a bleeder screw 220 may be added to second reservoir 74 in the embodiment shown in FIG. 1 so that brake fluid may be installed without removing cover 62. A similar bleeder screw 224 may be added to second reservoir 74 in the embodiment show in FIG. 4 along with the omission of second reservoir passage 122 so that each reservoir may be bled independently. While a single outlet 170 was formed in bleeder screw 128, it is possible to have two such outlets 170 that open through opposite sides of second section 162. While upper surface 98 in the disclosed embodiment is generally flat and horizontal, the shape of upper surface 94 may vary. For example, upper surface 94 may be replaced by an inclined upper surface 230.

The size, shape, location or orientation of the various components may be changed as desired. Components that are shown directly connected or contacting each other may have intermediate structures disposed between them. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bleeder screw for a bicycle hydraulic brake device comprising:
    an inner end;
    an outer end;
    a main body extending between the inner end and the outer end, wherein the main body includes;
        a first section having a threaded outer peripheral surface;
        a second section disposed between the first section and the inner end, wherein the second section has a smaller diameter than the threaded outer peripheral surface of the first section;
        wherein an axial length of the threaded outer peripheral surface is less than an axial length of the second section;
        an internal fluid passage;
        wherein the internal fluid passage opens through an outer peripheral surface of the second section at a location between the inner end and the threaded outer peripheral surface;
        wherein the internal fluid passage opens through the main body at a location between the threaded outer peripheral surface and the outer end; and
        a tool engagement surface disposed between the threaded outer peripheral surface and the outer end;
        wherein the tool engagement surface is disposed in close proximity to the first section; and
    a seal extending around a seal supporting outer peripheral surface of the main body between the threaded outer peripheral surface and the tool engagement surface;
    wherein there is no threaded outer peripheral surface on the main body between the seal and the tool engagement surface.

2. The bleeder screw according to claim 1 wherein the seal supporting outer peripheral surface is radially recessed.

3. The bleeder screw according to claim 2 wherein the seal comprises an O-ring.

4. The bleeder screw according to claim 1 wherein the tool engagement surface comprises an angled outer peripheral surface.

5. The bleeder screw according to claim 1 further comprising a sealing cap fitted to the outer end to seal the internal fluid passage from the atmosphere.

6. The bleeder screw according to claim 5 wherein the main body further comprises:
- a radially constricted outer peripheral surface; and
- a radially expanded outer peripheral surface disposed between the radially constricted outer peripheral surface and the outer end; and
- wherein the sealing cap extends over the radially expanded outer peripheral surface and includes a radially inwardly extending portion that engages the radially constricted outer peripheral surface.

7. A hydraulic apparatus for a bicycle brake lever device comprising:
- a first fluid reservoir having a first reservoir chamber and a first reservoir outlet;
- a second fluid reservoir having a second reservoir chamber and a second reservoir outlet;
- a common fluid passage in fluid communication with the first reservoir outlet and the second reservoir outlet to flow fluid from both the first reservoir chamber and the second reservoir chamber to the atmosphere;
- a first fluid passage in fluid communication with the first reservoir outlet and extending from the first reservoir outlet to the common fluid passage; and
- a second fluid passage in fluid communication with the second reservoir outlet and extending from the second reservoir outlet to the common fluid passage;
- wherein the first fluid passage and the second fluid passage have different lengths.

8. The apparatus according to claim 7 wherein the second reservoir chamber is in fluid communication with the first reservoir chamber at a location other than the common fluid passage.

9. The apparatus according to claim 7 further comprising a master cylinder having a master cylinder chamber dimensioned for receiving a master cylinder piston therein, wherein the first reservoir chamber is in fluid communication with the master cylinder chamber.

10. The apparatus according to claim 7 wherein the second fluid passage is elongated in the direction of fluid flow from the second reservoir outlet to the common fluid passage.

11. A hydraulic apparatus for a bicycle brake lever device comprising:
- a first fluid reservoir having a first reservoir chamber and a first reservoir outlet; and
- a second fluid reservoir having a second reservoir chamber and a second reservoir outlet;
- a common fluid passage in fluid communication with the first reservoir outlet and the second reservoir outlet to flow fluid from both the first reservoir chamber and the second reservoir chamber to the atmosphere;
- wherein an upper surface that forms the second reservoir chamber is higher than an upper surface that forms the first reservoir chamber.

12. The apparatus according to claim 11 wherein the second reservoir outlet is disposed at the upper surface of the second reservoir chamber.

13. The apparatus according to claim 11 wherein the second reservoir chamber is in fluid communication with the first reservoir chamber at a location other than the common fluid passage.

14. The apparatus according to claim 11 further comprising a master cylinder having a master cylinder chamber dimensioned for receiving a master cylinder piston therein, wherein the first reservoir chamber is in fluid communication with the master cylinder chamber.

15. A hydraulic apparatus for a bicycle brake lever device comprising:
- a first fluid reservoir having a first reservoir chamber and a first reservoir outlet;
- a second fluid reservoir having a second reservoir chamber and a second reservoir outlet;
- a common fluid passage in fluid communication with the first reservoir outlet and the second reservoir outlet to flow fluid from both the first reservoir chamber and the second reservoir chamber to the atmosphere; and
- a bleeder screw disposed in the common passage, wherein the bleeder screw inhibits fluid flow from at least one of the first reservoir chamber and the second reservoir chamber.

16. The apparatus according to claim 15 wherein the bleeder screw comprises:
- an inner end;
- an outer end;
- a main body extending between the inner end and the outer end, wherein the main body includes;
  - a first section having a threaded outer peripheral surface for engaging a threaded inner peripheral surface of the common passage;
  - wherein the inner end blocks fluid flow from the first reservoir outlet when the bleeder screw is screwed into the common passage;
  - an internal fluid passage;
  - wherein the internal fluid passage opens through a side of the main body at a location between the inner end and the threaded outer peripheral surface and is in fluid communication with the second reservoir outlet; and
  - wherein the internal fluid passage opens through the main body at a location between the threaded outer peripheral surface and the outer end.

17. The apparatus according to claim 16 wherein the internal fluid passage is in fluid communication with the second reservoir outlet when the inner end blocks fluid flow from the first reservoir outlet.

18. The bleeder screw according to claim 17 further comprising a sealing cap fitted to the outer end to seal the common passage from the atmosphere.

19. The apparatus according to claim 17 wherein an outer peripheral surface of the bleeder screw forms a transition passage with an inner peripheral surface of the common passage for communicating fluid between the second reservoir outlet and the internal fluid passage.

20. The apparatus according to claim 15 wherein the second reservoir chamber is in fluid communication with the first reservoir chamber at a location other than the common fluid passage.

21. The apparatus according to claim 15 further comprising a master cylinder having a master cylinder chamber dimensioned for receiving a master cylinder piston therein, wherein the first reservoir chamber is in fluid communication with the master cylinder chamber.

* * * * *